Nov. 10, 1953 W. J. STROH 2,659,056
COUPLING DEVICE
Filed June 28, 1951

INVENTOR
WALTER J. STROH
BY Francis W. Crotty
ATTORNEY.

Patented Nov. 10, 1953

2,659,056

UNITED STATES PATENT OFFICE 2,659,056

COUPLING DEVICE

Walter J. Stroh, Franklin Park, Ill., assignor to Zenith Radio Corporation, a corporation of Illinois Application June 28, 1951, Serial No. 233,969

2 Claims. (Cl. 333—77)

Figures 1, 2, 3, 4:
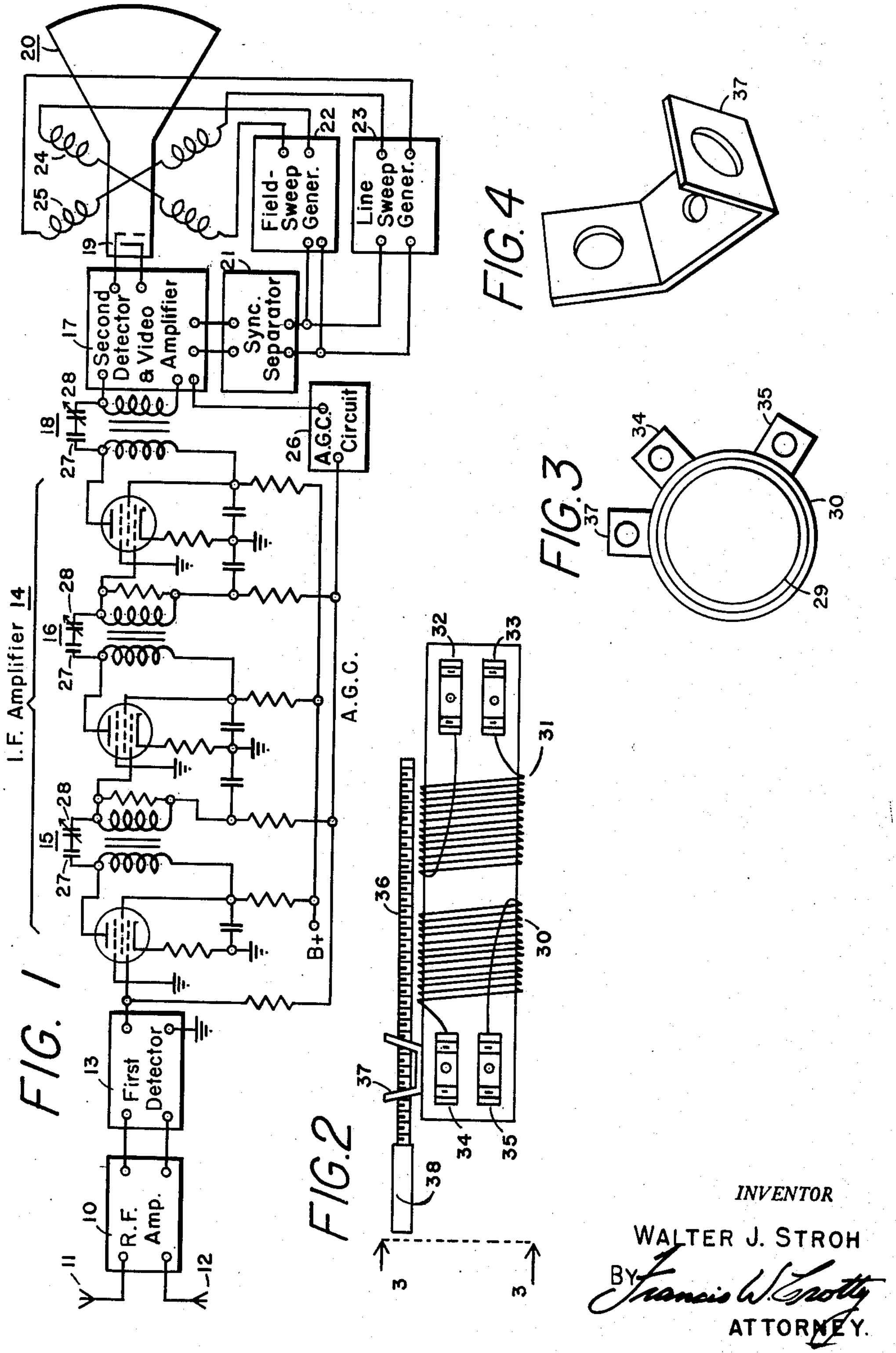

This invention relates to coupling networks and more particularly to a device for inter-coupling the various stages of a wave-signal receiver or the like.

Interstage coupling networks used, for example, in the intermediate-frequency amplifier of a radio or television receiver usually exhibit a certain band-pass frequency-response characteristic. That is, they have a substantially uniform and maximum response to the intermediate-frequency signal translated by the amplifier and its associated side-band frequencies, but a minimum response to all other frequencies. One well-known type of interstage coupling network comprises a tuned input circuit inductively and capacitively coupled to a tuned output circuit, the capacitive coupling between the circuits being adjustable to provide a control of the response characteristic. The input and output circuits are tuned to the selected intermediate frequency and the capacitive coupling is adjusted for maximum and uniform response to the intermediate-frequency carrier and its associated side-bands. Of course, in television vestigal side-band reception the capacitive coupling is adjusted so that the network passes the side-bands associated with the intermediate-frequency carrier in weighted relation to effect a proper frequency response.

It is an object of the present invention to provide an improved interstage coupling arrangement of the band-pass type in which a simple and expeditious means is provided for varying the capacitive coupling between the input and output circuits and, therefore, the band-pass characteristic of the arrangement.

A more general object of the invention is to provide an improved and inexpensive coupling device that may be constructed in a simple manner, and in which a variable capacitive coupling is provided between a pair of windings by means of a simple arrangement.

The improved coupling device of this invention comprises a tubular coil form with first and second windings wound thereon axially spaced from one another and inductively inter-coupled. A metallic member is supported by the coil form displaced radially from the external surface of the windings by a distance small with respect to the diameter of the coil form, and this member extends axially over the windings to form a capacitive coupling impedance therebetween. The metallic member may conveniently be threaded into a supporting clip at one end of the coil form so that it spans one of the windings and a portion of the other, the arrangement being such that rotation of the member moves it axially to vary the portion of the latter winding spanned by the member. This axial movement of the metallic member controls the capacitive coupling between the windings and, therefore, the band-pass characteristic of the arrangement.

The features of this invention which are believed to be new are set forth with particularity in the appended claims. The invention itself, however, together with further objects and advantages thereof may best be understood by reference to the following description when taken in conjunction with the accompanying drawing, in which:

Figure 1 shows a television receiver to which the present invention is applicable, Figure 2 shows one embodiment of the coupling device of this invention, Figure 3 shows a view of the coupling device taken along the lines 3—3 of Figure 2, and, Figure 4 shows a supporting clip utilized in the device.

The television receiver of Figure 1 includes a radio-frequency amplifier 10 having input terminals connected to an antenna circuit 11, 12 and output terminals connected to a first detector 13. First detector 13 is coupled to the first stage of an intermediate-frequency amplifier 14. The intermediate-frequency amplifier is shown as comprising three stages inter-coupled by means of coupling transformers 15 and 16, the final stage being coupled to a second detector and video amplifier 17 by a further transformer 18. The output terminals of unit 17 are connected to the input electrodes 19 of an image-reproducing device 20.

Unit 17 is further connected to a synchronizing-signal separator 21 which, in turn, is coupled to a field-sweep generator 22 and to a line-sweep generator 23. The output terminals of sweep generators 22 and 23 are connected respectively to the field-deflection elements 24 and line-deflection elements 25 of device 20. Unit 17 is also connected to an automatic gain control (AGC) circuit 26 whose output terminal is connected to the various stages of intermediate-frequency amplifier 14 to control the gain of these stages in accordance with the intensity of the received signals, as is well known.

A television signal intercepted by antenna circuit 11, 12 is amplified in radio-frequency amplifier 10 and heterodyned to the selected intermediate frequency of the receiver in first detector 13. The resulting intermediate-frequency signal is amplified in intermediate-frequency amplifier 14, detected and again amplified in unit 17, the resulting composite video signal being applied to input electrodes 19 to control the intensity of the cathode-ray beam in device 20 in accordance with the video intelligence represented by the television signal. The line- and field-synchronizing components of the received television signal are separated from the video components in synchronizing-signal separator 21 and utilized to synchronize the operation of sweep generators 22, 23 and, therefore, the line- and field-scansion of device 20. The sound portion of the receiver forms no part of the present invention and, for that reason, is not shown.

The coupling transformers 15, 16 and 18 in each instance have primary and secondary circuits tuned to the selected intermediate-frequency of the receiver. In order that these transformers may exhibit a desired band-pass characteristic, it is usual practice to provide an adjustable capacitive coupling between their input and output circuits. This capacitive coupling is indicated in Figure 1 by a fixed capacitor 27 and a series-connected variable capacitor 28. Variable capacitor 28 is adjusted so that the transformer exhibits substantially uniform and maximum response to the intermediate-frequency carrier and at least a portion of its associated side bands, and sharply attenuates all other frequencies. The present invention provides a coupling device that finds great utility in a television or other receiver to perform the functions of transformers 15, 16 or 18.

The coupling device as illustrated in Figures 2 and 3, comprises a tubular coil form 29 of insulating material having a first winding 30 and a second winding 31 wound thereon. These windings are axially spaced along the coil form and are inductively coupled to each other. The extremities of the windings are connected to terminal clips 32, 33, 34 and 35 secured to the coil form and having the configuration shown in Figure 4. A metallic member 36 is supported at one end of the coil form by means of a clip 37 which may be similar to clips 32—35. Member 36 preferably has the form of a rod threaded into clip 37 so that it may be moved axially upon rotation thereof. The rod may be equipped with a suitable handle 38 in the form of a fabric sleeve slipped over its free end, and is displaced radially from the external surface of windings 30, 31 by a distance small relative to the diameter of the coil form and extends over winding 30 and over a selectable portion of winding 31, as shown.

The rod 36 exhibits a fixed capacity with coil 30 so long as it spans the entire length of the coil. However, it exhibits a capacity with coil 31 which varies as the member is shifted axially and is determined by the portion of the latter coil spanned thereby. In this manner, the metallic rod 36 provides a capacitive coupling for coils 30, 31 whose electrical equivalent is series connected fixed and variable capacitors represented by capacitors 27 and 28 in Figure 1.

Member 36 may be formed of brass or any other suitable metal to provide the desired capacitive effect and is preferably resilient in nature to enable it to be conveniently threaded into clip 37. When so desired, a strip of insulating tape may be wrapped around coils 30, 31 between the coils and the metallic rod to provide a dielectric other than air for the capacitive coupling impedance formed between the coils and the rod. It is desirable that the cross-sectional area of rod 36 be small relative to the cross-section of coils 30, 31 so that the rod links relatively few magnetic lines and has negligible effect on the apparent inductance of these coils.

The invention provides, therefore, a simple and inexpensive coupling device which may be used to couple together the various stages of a wave-signal receiver or the like and which includes means for establishing a desired variable band-pass characteristic for the arrangement.

While a particular embodiment of the invention has been shown and described, modifications may be made and it is intended in the appended claims to cover all such modifications as fall within the true spirit and scope of the invention.

I claim:

1. A coupling device for a wave-signal receiver and the like comprising: a tubular coil form; a first winding wound on said coil form; a second winding wound on said coil form axially spaced from and inductively coupled to said first winding; at least one terminal clip of U-shaped configuration, secured at its bight end to said coil form, and having apertured extending arms substantially aligned axially of said windings; and a metallic, threaded member having a maximum transverse dimension small relative to the radius of said coil form journaled in the apertures of said arms and supported by said terminal clip for movement axially of said windings to introduce a component of capacitive coupling between said windings determined by the position of said member.

2. A coupling device for a wave-signal receiver and the like comprising: a tubular coil form; a first winding wound on said coil form; a second winding wound on said coil form axially spaced from and inductively coupled to said first winding; a plurality of terminal clips on said coil form, at least two of which provide terminal connections for said windings; a third one of said terminal clips having a U-shaped configuration, secured at its bight end to said coil form, and having apertured extending arms substantially aligned axially of said windings; and a metallic, threaded member having a maximum transverse dimension small relative to the radius of said coil form journaled in the apertures of said arms and supported by said third terminal clip for movement axially of said windings to introduce a component of capacitive coupling between said windings determined by the position of said member.

WALTER J. STROH.

References Cited in the file of this patent

UNITED STATES PATENTS

| Number | Name | Date |
|---|---|---|
| Re. 22,195 | Harnett | Oct. 6, 1942 |
| 1,641,438 | Jones | Sept. 6, 1927 |
| 1,690,228 | Heising | Nov. 6, 1928 |
| 1,913,544 | Haben | June 13, 1933 |
| 2,137,435 | Yolles | Nov. 22, 1938 |
| 2,569,106 | James et al. | Sept. 25, 1951 |